March 1, 1960 J. J. LEBA 2,926,451
FISH LURE
Filed Sept. 8, 1958

INVENTOR.
JOHN J. LEBA
BY Moore, White & Burd
ATTORNEYS

United States Patent Office 2,926,451
Patented Mar. 1, 1960

2,926,451

FISH LURE

John J. Leba, Minneapolis, Minn.

Application September 8, 1958, Serial No. 759,480

7 Claims. (Cl. 43—42.14)

This invention relates to a new and improved fish lure of the spinner type. More particularly this invention relates to a spinning fish lure provided with two spinners adapted to rotate when the lure is drawn through the water. One of the spinners is unbalanced in order to impart an irregular side to side and up and down motion to the lure as it moves through the water. The other spinner is aft of the first and is balanced to churn the water as it passes from the forward spinner toward the hook.

The invention is illustrated by the drawings in which the same numerals refer to corresponding parts and in which.

Figure 1:
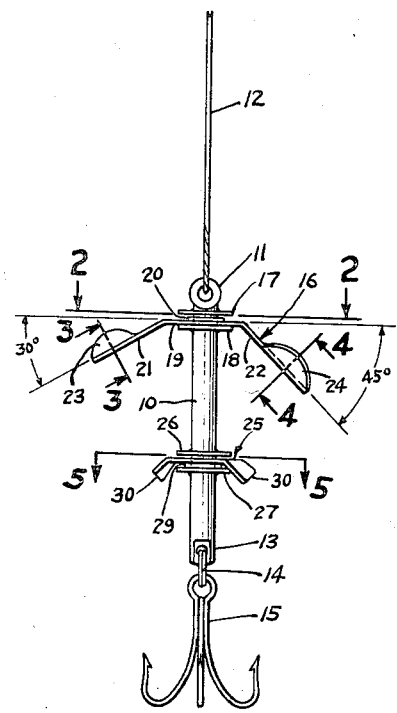
Figure 1 is a vertical elevation of the lure of this invention, seen as it is suspended vertically from the end of a line.

Referring to the drawings, the lure of this invention generally comprises an elongated body or shank 10, provided with an eye 11 at its forward or upper end by which the lure may be attached to the end of a fish line or leader 12. At the lower or aft end of the body 10, there is provided a further eyelet 13 adapted to receive a ring 14 for attachment of a fish hook 15. Although shown with a three tine hook it will be apparent that the form of hook may be varied as desired.

At the forward or upper end of the body as shown in Figure 1, an unbalanced spinner, indicated generally at 16, is mounted for rotation adjacent the eye 11 between two spaced apart washers 17 and 18 secured to the body perpendicular to the axis thereof. The spinner 16 comprises a flat annular hub 19 provided with a central aperture and an internal annular shoulder 20 surrounding the aperture which serves as a bushing for the rotation of the hub about the body 10. The washers 17 and 18 are spaced apart just sufficiently to permit and guide the rotation of the hub 19 of the spinner in a plane perpendicular to the axis of the body.

Figure 3:
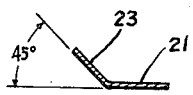
Figure 3 is a section on the line 3—3 of Figure 1 and in the direction of the arrows through one blade of the unbalanced spinner.
Figure 4:
Figure 4 is a section on the line 4—4 of Figure 1 and in the direction of the arrows through the other blade of the unbalanced spinner.
Figure 5:
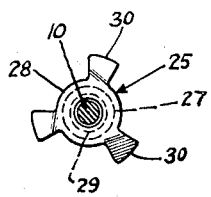
Figure 5 is a horizontal section taken on the line 5—5 of Figure 1 and in the direction of the arrows showing a plan view of the balanced aft spinner.

The spinner 16 is provided with a pair of blades 21 and 22 extending generally radially outwardly from the opposite sides of the hub portion 19. Blade 21 is bent to incline backwardly toward the hook 15 from the edge of the hub 19 at an angle of about 30° from the plane of the hub. The blade 21 is generally ovoid in shape and is generally flat with zero pitch except for a forwardly or upwardly bent leading edge or fin 23 which, as shown in Figure 3 is inclined at an angle of about 45° from the normal plane of the blade 21. Blade 22 which projects outwardly from the opposite side of the hub 19 is of generally the same size and shape as blade 21, but blade 22 is inclined downwardly or rearwardly from the plane of the hub 19 at an angle of about 45° and the leading edge of fin 24 of blade 22 is inclined forwardly or upwardly at an angle of about 30°.

Figure 2:
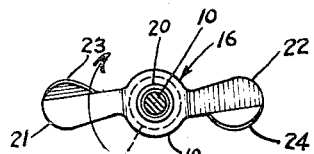
Figure 2 is a horizontal section on the line 2—2 of Figure 1 and in the direction of the arrows showing a plan view of the forward or unbalanced spinner.

When viewed from the front or the top, the spinner 16 will rotate in a clockwise direction as it is drawn through the water toward the viewer, as indicated by the arrow in Figure 2. Because of the imbalance between the two blades of the spinner 16, as the lure is drawn through the water (and the spinner is caused to rotate about the shank), an irregular movement or motion is imparted to the lure. Instead of moving generally in a straight line, it will tend to move from side to side and up and down. When drawn through the water near the surface, the lure will tend to move intermittently under and over the surface of the water and thus simulate the action of a large dragonfly known colloquially as a "darning needle." When drawn through the water vertically as in ice fishing, the lure tends to follow an erratic helical path.

Although the angles of inclination of the blades of the unbalanced spinner and the angles of inclination of the leading edges of those blades are shown to be either 30° and 45° and described as being of about these values, it is to be understood that some deviation from these values is possible provided the relationships between the angles are maintained. Thus, for example, blade 21 may be inclined from the plane of the hub 19 between about 25° and 35° and blade 22 may be inclined from that plane by between about 40° and 50°. At the same time, the leading edge 23 of blade 21 may be inclined from the plane of that blade by between about 40° and 50° while the leading edge 24 of blade 22 may be inclined from the plane of that blade by between about 25° and 35°. In each case, however, the leading edge 23 of blade 21 should be inclined from the plane of that blade by about the same value as blade 22 is inclined from the plane of the hub 19 and the leading edge 24 of blade 22 should be inclined from the plane of that blade by about the same value as blade 21 is inclined from the plane of the hub 19. Thus, although the precise angles of inclination may be varied slightly, the respective relationships between the inclined blade and inclined leading edges are maintained the same.

A second spinner, indicated generally at 25, of somewhat lesser diameter than spinner 16 is supported for rotational movement about the lure body 10 spaced aft from the unbalanced spinner 16 and forward of the hook 15 held and guided between washers 26 and 27 secured to the body 10 to lie in a plane perpendicular to the axis of the body. Spinner 25 includes an annular hub 28 provided with a central aperture and a surrounding annular shoulder 29 which serves as a bushing for the rotation of the spinner 25. The washers 26 and 27 are spaced apart on the shank 10 just sufficiently to permit rotation of the spinner 25 with the hub 28 moving in a plane perpendicular to the axis of the lure body.

Spinner 25 is provided with a plurality of like blades 30 evenly distributed about the periphery of the hub 28 to maintain the balance of the spinner. The blades 30 are inclined rearwardly or downwardly with respect to the plane of the hub and are pitched to cause rotation of the spinner in a counter-clockwise direction when the lure is drawn through the water. The function of the balanced spinner 25 is to churn the water behind the unbalanced spinner. The rearward inclination and angle of pitch of the blades is not critical. In the preferred embodiment the balanced spinner 25 is shown with three blades. This is the preferred construction although spinner 25 may be provided with a greater number of blades so long as proper balance of the spinner is maintained.

Although the lure of this invention is illustrated and described as having the unbalanced spinner rotate in a clockwise direction, and the balanced spinner rotate in a counter-clockwise direction, it will be apparent that the directions of movement of the two spinners may readily be reversed by changing the pitch of the balanced spinner blades and reversing the inclined leading edges or fins of the blades of the unbalanced spinner. The direction of rotation is immaterial so long as the two spinners rotate in opposite directions.

The lure of this invention may obviously be made in a variety of sizes, from a small size lure for a fly rod through intermediate sizes for trolling or casting rods and large sizes for deep sea fishing. The illustrated three prong fish hook can be replaced by double or single hooks. The depth of the lure in the water and the rate of rotation of the spinners is regulated by the speed of trolling or casting. Faster speed causes the lure to move at the surface of the water and when the lure surfaces, it gargles and churns the water at faster speeds. When the lure is in action in the water with the fins whirling, it simulates the appearance of insects. The lure of this invention can be used for still fishing, as for deep trout fishing or winter ice fishing, in which the lure is moved vertically up and down through the water. When used in this manner, the lure has an irregular helical motion. The lure may be used either with bait or with bare hooks.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A fish lure comprising an elongated body, means for securing the lure to a line at one end of the body and means for securing a fish hook at the other end of the body, an unbalanced spinner mounted for rotation about said body adjacent the end of said lure adapted to be secured to a line, and a second spinner mounted for rotation about said body between said first spinner and said hook, said second spinner being balanced and having a plurality of blades greater in number than the blades of said first spinner; said blades of said second spinner being evenly spaced around the periphery of the spinner and pitched to rotate in a direction opposite to the direction of rotation of said first spinner.

2. A fish lure according to claim 1 further characterized in that said unbalanced spinner includes a hub and a pair of generally ovoid blades projecting generally radially outward therefrom, each of said blades being inclined aft toward said hook away from the plane of said hub and the leading edge of each of said blades being inclined forwardly, said blades and said leading edges being inclined different amounts, the first of said blades being inclined at an angle from the plane of said spinner hub by an amount approximately equal to the angular inclination of the leading edge of said second blade from the plane of that blade, and said second blade being angularly inclined from the plane of said hub by an amount approximately equal to the angular inclination of the leading edge of said first blade from the plane of the blade surface.

3. A fish lure according to claim 2 further characterized in that said first blade is inclined aft toward said hook at an angle between about 25° and 35° from the plane of the hub of said spinner, and the leading edge of said first blade is inclined forwardly from the plane of said first blade at an angle between about 40° and 50°, said second blade is inclined aft from the plane of the hub of said spinner at an angle between about 40° and 50° and the leading edge of said second blade is inclined forwardly from the plane of that blade at an angle between about 25° and 35°.

4. A fish lure according to claim 3 further characterized in that said first blade is inclined aft from the plane of the hub of said spinner by an angle of about 30°, and the leading edge of said blade is inclined forwardly from the plane of said blade at an angle of about 45°, said second blade is inclined from the plane of the hub of the spinner at an angle of about 45° and the leading edge of said blade is inclined forwardly at an angle of about 30° from the plane of said second blade.

5. A fish lure according to claim 1 further characterized in that the angularly inclined leading edges of said unbalanced spinner are pitched to move that spinner in a clockwise direction, when said lure has drawn through the water toward a user and the blades of said second spinner are pitched to move said second spinner in a counter-clockwise direction when said lure has drawn through the water toward a user.

6. A fish lure according to claim 1 further characterized in that said second spinner is of lesser diameter than the first and is provided with three blades evenly spaced about the periphery of the spinner.

7. A fish lure comprising an elongated generally cylindrical body, means at one end of said body for securing said lure to a line, means at the opposite end of said body for securing a fish hook to said lure, a first spinner mounted for rotation about said lure body adjacent the end thereof adapted to be secured to a line, said first spinner being unbalanced and including a pair of generally like ovoid blades extending radially from opposite sides of a flat annular hub, said hub having a central aperture through which said body passes, said spinner being held on said body between a pair of spaced apart washers secured to said body, the blades of said first spinner being inclined aft toward said fish hook and each blade having a leading edge pitched angularly forward, said first blade being inclined aft at an angle of about 30° from the plane of said spinner hub, the leading edge of said first blade being pitched forwardly at an angle of about 45° from the plane of said blade, said second blade being inclined aft at an angle of about 45° from the plane of said hub and the leading edge of said second blade being pitched forwardly at an angle of about 30° from the plane of said second blade, a second spinner of lesser diameter than the first mounted for rotation about said lure body between said first spinner and said fish hook, said second spinner including a flat hub having an aperture therein through which said lure body passes, said spinner being positioned on said body between a pair of spaced washers secured to said body, said second spinner being balanced with a plurality of three blades evenly spaced about the periphery of the hub, the blades of said second spinner being pitched to rotate said spinner in a direction opposite to the direction of rotation of said first spinner.

References Cited in the file of this patent

UNITED STATES PATENTS

| | | |
|---|---|---|
| 923,095 | Wilcox | May 25, 1909 |
| 1,790,456 | Bennington | Jan. 27, 1931 |
| 2,472,639 | Wickens | June 7, 1949 |
| 2,516,434 | Swan | July 25, 1950 |